United States Patent

[11] 3,620,448

| [72] | Inventors | Clifford L. Nelson;<br>David J. Sutton, both of Minneapolis, Minn. |
|---|---|---|
| [21] | Appl. No. | 861,023 |
| [22] | Filed | Sept. 25, 1969 |
| [45] | Patented | Nov. 16, 1971 |
| [73] | Assignee | Honeywell Inc.<br>Minneapolis, Minn. |

[54] CLOCK-THERMOSTAT SYSTEM
4 Claims, 2 Drawing Figs.

[52] U.S. Cl. .................................................. 236/46,
219/492, 317/132
[51] Int. Cl. .................................................. F23n 5/20
[50] Field of Search ........................................ 236/46, 78,
46 F, 74; 219/492; 317/132

[56] References Cited
UNITED STATES PATENTS

| 2,262,962 | 11/1941 | Pierson .......................... | 236/46 |
| 2,266,255 | 12/1941 | Osterheld ...................... | 219/492 X |
| 2,344,820 | 3/1944 | Kearsley ........................ | 219/492 X |
| 3,168,242 | 2/1965 | Diener ........................... | 236/78 X |
| 3,326,275 | 6/1967 | Ray ............................... | 236/68 X |
| 3,358,922 | 12/1967 | Norton .......................... | 236/68 X |

*Primary Examiner*—William E. Wayner
*Attorneys*—Lamont B. Koontz, Francis A. Sirr and Robert S. Craig ABSTRACT: A clock-thermostat system in which the thermostat located in the controlled space is connected to the furnace and a power supply by two wires which energize the synchronous clock motor as well as transmit information as to whether the thermostat is calling for heat. The thermostatic switch is connected to a rectifier that superimposes a direct current component on the alternating current supply to the clock motor, which component is sensed by control apparatus at the furnace.

PATENTED NOV 16 1971

3,620,448

INVENTOR.
CLIFFORD L. NELSON
DAVID J. SUTTON
BY Robert S. Craig
ATTORNEY.

CLOCK-THERMOSTAT SYSTEM

CLOCK THERMOSTAT SYSTEM

Clock thermostats have required at least three wires in order to energize the clock motor and to provide a control circuit. The clock circuit must be continually energized while the control circuit is intermittently energized. In the case of original construction providing three or more wires presents little more difficulty than running the two wires required by a plain thermostat. However, where it is desired to change from a plain thermostat to a clock thermostat in existing construction, running additional wires is expensive and sometimes nearly impossible. The present invention provides a way to use two wires for both clock energization and control so that no additional wires need to be run. This is accomplished by changing the alternating current wave pattern to supply the control information while not affecting clock motor energization.

In the illustrative embodiments this is accomplished by superimposing a direct current component on the alternating current supply.

Figure 1:
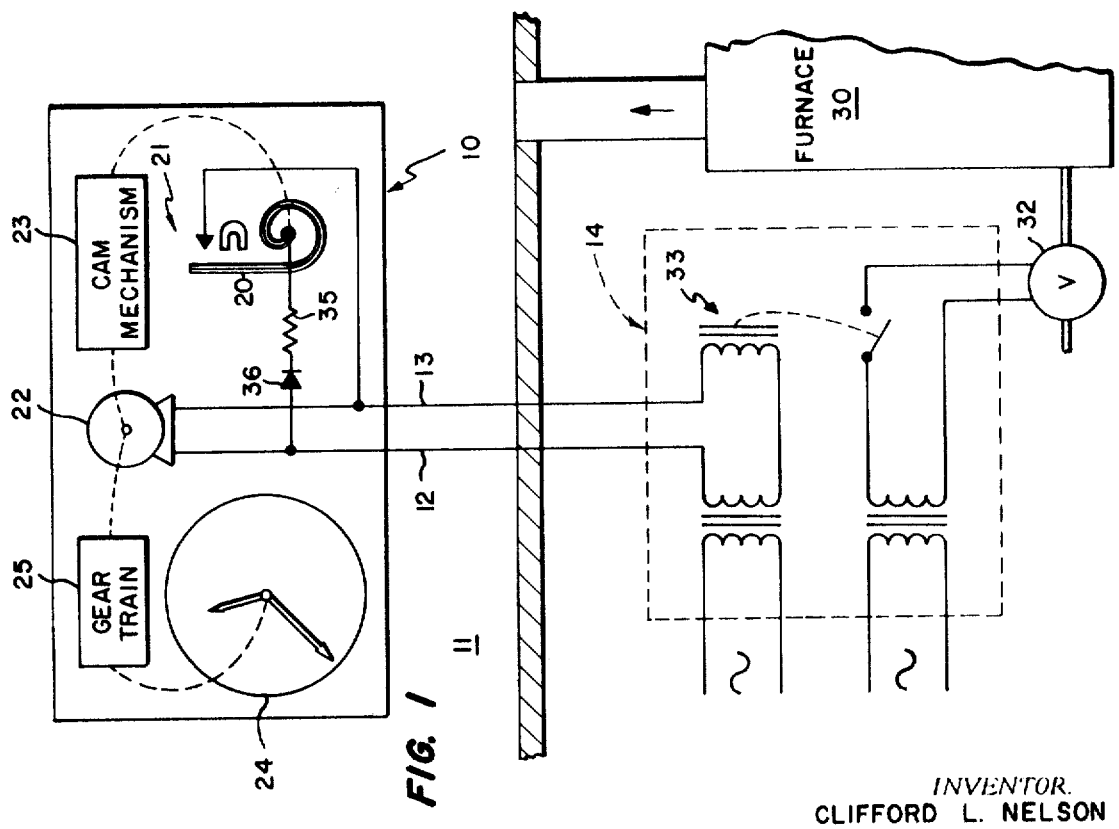
FIG. 1 is a schematic showing of the connection of an electric clock thermostat to a power supply and apparatus to control operation of a furnace.

In FIG. 1 an electric clock thermostat unit 10 is located in a space 11 the temperature of which is to be controlled. Thermostat 10 is connected over a circuit having two wires 12 and 13 to a power supply and furnace control unit 14. Clock thermostat 10 may be similar to that disclosed in Kronmiller U.S. Pat. No. 2,558,617. A bimetal element 20 controls a switch 21 in response to space temperature. The control point of the thermostat is changed in accordance with a time schedule by motor 22 which is connected through a cam mechanism 23 to the bimetal 20. A clock 24 has hands that are connected by a gear train 25 to the motor 22. A typical sequence might maintain a daytime temperature of 72° F. which is changed at 10:00 p.m. to 65° F., and back to 72° F. at 6:00 a.m.

A furnace 30 arranged to heat the space 11 is supplied with fuel necessary by a gas valve 32 which is energized by a direct current relay 33 actuated by closure of the thermostatic switch 21.

When there is no call for heat by thermostat 10, the clock motor 22 is energized by alternating current flowing in wires 12 and 13 and through the windings of relay 33. The characteristics of relay 33 are so chosen that it will not operate with the clock motor alternating current along on its windings.

When there is a call for heat the switch contacts 21 close and complete a circuit between wires 12 and 13 through a customary anticipating heater 35 and a diode 36. The on-off direct current flowing in the circuit will be superimposed on the alternating current flowing in wires 12 and 13 and through the direct current relay 33. Under this condition the current wave form or pattern will change or shift in position or configuration and the relay will sense the direct current component and pull in to actuate the gas valve 32. Likewise, when the thermostatic switch 21 opens, the current wave form will return to symmetrical alternating current and the relay 33 will drop out and the furnace cease operation.

Thus it will be seen that an electric clock thermostat can be connected by only two wires which serve to continuously energize the clock motor and also carry the control current.

Figure 2:
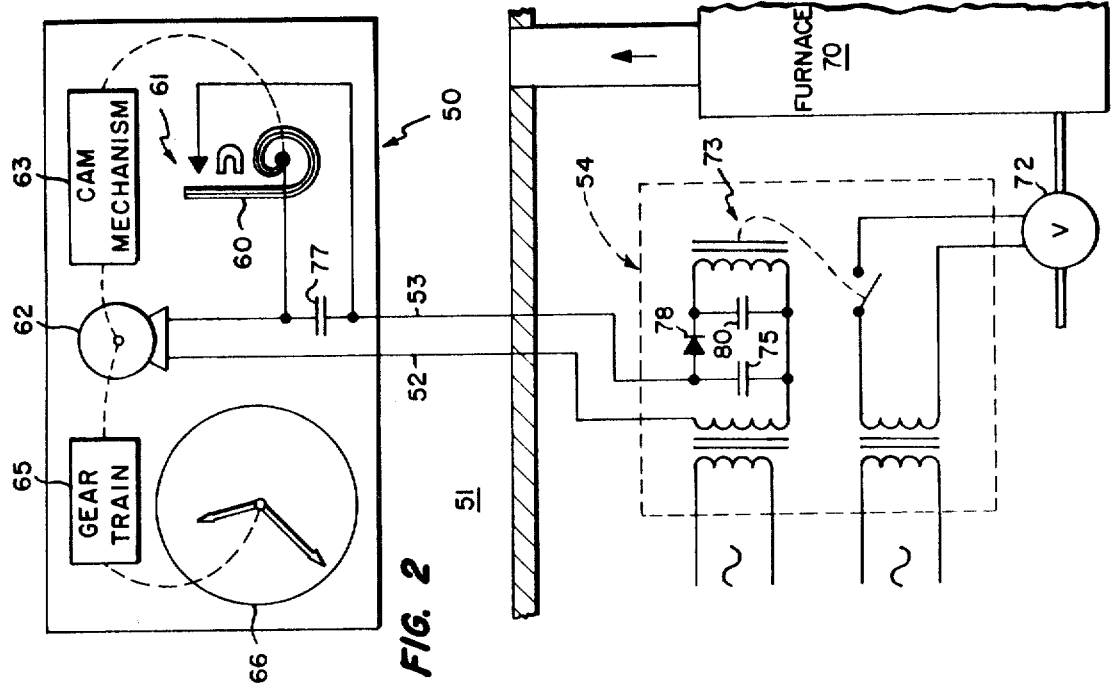
FIG. 2 is a modified form of a system for controlling a furnace from a clock thermostat.

FIG. 2 shows another system that allows operation of an electric clock thermostat with only two connecting wires. An electric clock thermostat unit 50 is located in a space 51 the temperature of which is to be controlled. Thermostat 50 is connected by a circuit having two wires 52 and 53 to a power supply and furnace control unit 54. The clock thermostat is similar to that shown in FIG. 1. A bimetal element 60 controls a switch 61 in response to space temperature. A motor 62 is connected by cam mechanism 63 to the bimetal to change its control point at predetermined times. A gear train 65 connects the motor to the hands of clock 66.

A furnace 70 arranged to heat the space 51 is supplied with fuel by a gas valve 72 which is energized by actuation of relay 73 on a call for heat by thermostat 50.

When there is no call for heat and the switch 61 is open, the clock motor is energized by alternating current flowing in wires 52 and 53 in series with a capacitor 75 associated with the power supply and a capacitor 77 located in the thermostat. A diode 78 and the winding of relay 73 are connected in series across the capacitor 75 but not direct current can be supplied from the power source because capacitor 77 permits only alternating current to flow in wires 52 and 53.

On a call for heat the switch 61 will close, shorting out capacitor 77. It is now possible for current to flow through the relay winding and diode 78. Diode 78 passes pulsating direct current to the relay but a capacitor 80 across the relay winding serves to provide continuous direct current and eliminate possible relay chatter. Energization of relay 73 closes a circuit to gas valve 72 to cause furnace 70 to supply heat to space 51. When the thermostat is satisfied, switch 61 will open, placing capacitor 77 in the circuit and removing the direct current component flowing in wires 52 and 53 and thus deenergizing the relay 73.

The modification of FIG. 2, like FIG. 1, utilizes a change in current wave form to provide a control signal to indicate a call for heat while continuously energizing the clock motor.

The embodiments of the invention in which an exclusive property or right is claimed are defined as follows.

1. In a two wire electric clock temperature-control system wherein a clock thermostat unit comprising a continuously energized clock motor and a thermostat located in a space is connected by two wires to a remote second unit comprising an alternating current power supply and a control apparatus for controlling the operation of temperature-conditioning apparatus supplying temperature-conditioned medium to the space comprising, first means located at the thermostat and electrically connected to the thermostat for changing the current wave pattern from a first to a second configuration when the thermostat calls for a change in temperature, and second means connected to the power supply and associated with the control apparatus for responding to the wave pattern change causing the temperature-conditioning apparatus to operate.

2. In a two wire electric clock temperature-control system wherein a clock thermostat unit comprising a continuously energized clock motor and a thermostat located in a space is connected by two wires to a remote second unit comprising an alternating current power supply and a control apparatus for controlling the operation of temperature-conditioning apparatus supplying temperature-conditioned medium to the space comprising, first means located at the thermostat and electrically connected to the thermostat for shifting the relative position of the current wave pattern from a first to a second position when the thermostat calls for a change in temperature, and second means connected to the power supply and associated with the control apparatus for responding to the wave pattern shift causing the temperature-conditioning apparatus to operate.

3. A control system according to claim 2 in which shift in current waveform is the result of superimposing a direct current component on the alternating current supplied over the two wires to the clock motor.

4. In a power supply and current wave-pattern-responsive apparatus comprising:

a source of power, and circuit means comprising two wires adapted to connect
said source of power to a load, the load comprising a space clock thermostat having a continuously energized clock motor and temperature-responsive switch means whereby a supply current over the two wires changes in wave pattern when the switch operates, said circuit means comprising:

responsive means responsive to the change in current wave pattern of the current supplied over the two wires, said responsive means being adapted to control temperature-conditioning apparatus furnishing temperature-conditioned medium to the space, said clock motor and said temperature-responsive switch comprising a unit remotely located from said source of power and said responsive means comprising another unit connected to said first unit solely by said two wires.

* * * * *